(12) United States Patent
Amighi et al.

(10) Patent No.: US 12,092,559 B2
(45) Date of Patent: Sep. 17, 2024

(54) METHOD, SYSTEM, AND LIGHTING MODULE FOR FAST-MOVING PARTICLE CHARACTERIZATION

(71) Applicant: MAZLITE INC., Toronto (CA)

(72) Inventors: Amirreza Amighi, Toronto (CA); Cameron Dallas, New Westminster (CA); Nasser Ashgriz, Thornhill (CA); Pierre Sullivan, Toronto (CA); Ramin Ranjbar, Toronto (CA)

(*) Notice: Subject to any disclaimer, the term of this patent is extended or adjusted under 35 U.S.C. 154(b) by 154 days.

(21) Appl. No.: 17/656,443

(22) Filed: Mar. 25, 2022

(65) Prior Publication Data

US 2022/0214265 A1  Jul. 7, 2022

Related U.S. Application Data

(63) Continuation of application No. PCT/CA2021/051165, filed on Aug. 23, 2021.

(60) Provisional application No. 63/069,343, filed on Aug. 24, 2020.

(51) Int. Cl.
| | |
|---|---|
| *G01N 15/1434* | (2024.01) |
| *H04N 23/51* | (2023.01) |
| *H04N 23/52* | (2023.01) |
| *H04N 23/56* | (2023.01) |
| *G01N 15/14* | (2006.01) |
| *H04N 23/50* | (2023.01) |

(52) U.S. Cl.
CPC ......... *G01N 15/1434* (2013.01); *H04N 23/51* (2023.01); *H04N 23/52* (2023.01); *H04N 23/56* (2023.01); *G01N 2015/1493* (2013.01); *G01N 2015/1497* (2013.01); *H04N 23/555* (2023.01)

(58) Field of Classification Search
CPC ....... G01N 15/1434; G01N 2015/1493; G01N 2015/1497; H04N 23/51; H04N 23/56; H04N 23/52; H04N 23/555
USPC .......................................................... 348/121
See application file for complete search history.

(56) References Cited

U.S. PATENT DOCUMENTS

| | | | |
|---|---|---|---|
| 8,988,681 B2 | 3/2015 | Ashgriz | |
| 2017/0074768 A1* | 3/2017 | Moitzi | G01N 15/1436 |
| 2018/0045634 A1* | 2/2018 | Bachalo | G01N 15/0205 |
| 2020/0376488 A1* | 12/2020 | Wu | B01L 3/0241 |
| 2021/0190671 A1* | 6/2021 | Vanmeerbeeck | G01N 15/1459 |
| 2021/0389601 A1* | 12/2021 | O'Toole | G02B 27/0944 |

OTHER PUBLICATIONS

International Search Report and Written Opinion for PCT/CA2021/051165, dated Dec. 2, 2021.

* cited by examiner

*Primary Examiner* — Frantz B Jean
(74) *Attorney, Agent, or Firm* — Bhole IP Law; Anil Bhole; Marc Lampert (57) ABSTRACT

There is provided a system, method, and lighting module for fast-moving particle characterization. The lighting module can include a light source directed at the particles to generate a light beam of incoherent or semi-coherent light; and a pulse generator connected to the light source to direct the light source to generate the light beam when in receipt of a trigger signal, the pulse including a time period on a nanosecond scale. In some cases, the light beam can be conditioned with optical elements into a homogeneous flat-top profile. In some cases, the trigger signal is generated by a camera module, which is passed through a synchronization board to compensate for any noise.

20 Claims, 11 Drawing Sheets

| Trigger Mode | Syntax | |
|---|---|---|
| | | External Trigger |
| Edge, negative | Trgmode 0 | |
| Edge, positive | Trgmode 1 | |
| Pulse, negative | Trgmode 4 | |
| Pulse, positive | Trgmode 5 | |

METHOD, SYSTEM, AND LIGHTING MODULE FOR FAST-MOVING PARTICLE CHARACTERIZATION

TECHNICAL FIELD

The following relates generally to particle imaging; and more specifically, to a system, method, and lighting module for fast-moving particle characterization.

BACKGROUND

Spray nozzles have numerous applications, such as in spray cooling systems, coating devices, irrigation and pesticide application in agriculture industry, and in fuel injection systems of most engines. Sprays formed by a spray nozzle are characterized by the size and velocity distributions of the droplets, which depend on the nozzle geometry, fluid flow rates and pressures, and fluid properties. Droplet size distribution is an important characteristic of a spray, which influences how a system uses a spray. For instance, the droplet size distribution changes the cooling rate and the uniformity of the cooling, which change the final product quality. In liquid fuel combustion engines, the fuel spray droplet size distribution changes the combustion efficiency and the rate of pollution generation. In the agricultural industry, the size of the pesticide droplet dictates the efficiency of the crop coverage and the likelihood of pesticide droplets being carried away by the wind and becoming a hazard to the environment. In coating applications, the consistency of the coating and its thickness depends on the size of the droplets produced by the spray nozzle.

SUMMARY

In one aspect, a lighting module for fast-moving particle characterization is provided, the lighting module comprising: a light source directed at the particles to generate a light beam of incoherent or semi-coherent light; and a pulse generator coupled to the light source to direct the light source to generate the light beam when in receipt of a trigger signal, the pulse comprising a time period on a nanosecond scale.

In a particular case, the light source comprises infrared lasers.

In a particular case, the light source further comprises one or more low magnification lenses.

In a particular case, the light source comprises at least one near infrared laser diode.

In a particular case, the light source comprises an array of near-infrared laser diodes.

In a particular case, the light source comprises at least one near infrared light emitting diode.

In a particular case, the light source comprises an array of near infrared light emitting diodes.

In a particular case, light produced from the light source is a combination of beams from each diode in the array.

In a particular case, the beams are conditioned into a homogeneous flat-top profile of incoherent or semi-coherent light using optical elements.

In a particular case, the optical elements comprise a homogenizing light rod which homogenizes and decoheres the light.

In a particular case, the optical elements comprise a diffuser to decohere the light.

In a particular case, the optical elements comprise a collimator to collimate the light.

In a particular case, the collimator is an aspherical doublet lens.

In a particular case, the optical elements comprise a microlens array.

In a particular case, the optical elements comprise a liquid light guide.

In a particular case, the optical elements comprise a fiber optic cable.

In a particular case, the light beam has optical power less than 85 uJ.

In a particular case, the light beam has optical power in the order of 65 uJ and the pulse has a duration on the order of 10 ns to 100 ns.

In a particular case, the light source has a wavelength of 532 nm.

In a particular case, the light source has a wavelength of 905 nm.

In another aspect, an apparatus for fast-moving particle characterization is provided, the apparatus comprising: a light source directed at the particles to generate a light beam of incoherent or semi-coherent light; a pulse generator coupled to the light source to direct the light source to generate the light beam when in receipt of a trigger signal, the pulse comprising a time period on a nanosecond scale; and a camera for capturing an image of the particles when illuminated by the light beam.

In a particular case, the apparatus is insertable into a spray environment.

In a particular case, the apparatus further comprises a mechanical housing enclosing the light source, the pulse generator and the camera.

In a particular case, the housing is submersible and operable in hazardous locations.

In a particular case, the light source comprises infrared lasers.

In a particular case, the light source further comprises one or more low magnification lenses.

In a particular case, the camera is a high-resolution camera.

In a particular case, the camera is preconfigured to focus at a specific working distance.

In a particular case, the apparatus further comprises a telecentric lens with high transmission and low magnification.

In a particular case, the apparatus further comprises a window disposed between the camera and the particles.

In a particular case, the apparatus further comprises a purge plate disposed between the window and the particles to prevent build in of particles and debris on the window.

In a particular case, the apparatus further comprises a purge inlet in fluid communication with an outlet proximate the purge plate, wherein a fluid flowing through the purge inlet forms a curtain along the purge plate to further prevent build in of particles and debris on the window.

In a particular case, the fluid is one of compressed air, an inert gas, a solvent, water, or alcohol.

In a particular case, the window further comprises a lip to prevent build in of particles and debris on the window.

In a particular case, the housing comprises an air curtain to clean windows of the housing.

In a particular case, the apparatus further comprises an image analysis module to determine characteristic of the particles, comprising one or more of size, shape, velocity, number, and density.

In a particular case, the image analysis module is physically located within a housing also enclosing the camera and the light source.

In a particular case, the image analysis module is physically located remote from a housing enclosing the camera and the light source.

In a particular case, the apparatus further comprises a synchronization board, wherein the pulse generator is triggered by the synchronization board, the synchronization board receiving a trigger signal from the camera.

In a particular case, the synchronization board executes a noise reduction algorithm to output a noise-reduced signal to the pulse generator.

In a particular case, the light source comprises at least one near infrared laser diode.

In a particular case, the light source comprises an array of near-infrared laser diodes.

In a particular case, the light source comprises at least one near infrared light emitting diode.

In a particular case, the light source comprises an array of near infrared light emitting diodes.

In a particular case, light produced from the light source is a combination of beams from each diode in the array.

In a particular case, the beams are conditioned into a homogeneous flat-top profile of incoherent or semi-coherent light using optical elements.

In a particular case, the optical elements comprise a homogenizing light rod which homogenizes and decoheres the light.

In a particular case, the optical elements comprise a diffuser to decohere the light.

In a particular case, the optical elements comprise a collimator to collimate the light.

In a particular case, the collimator is an aspherical doublet lens.

In a particular case, the optical elements comprise a microlens array.

In a particular case, the optical elements comprise a liquid light guide.

In a particular case, the optical elements comprise a fiber optic cable.

In a particular case, the light beam has optical power less than 85 uJ.

In a particular case, the light beam has optical power in the order of 65 uJ and the pulse has a duration on the order of 10 ns to 100 ns.

In a particular case, the camera has a resolution ranging from 6 to 9 megapixels, a pixel size between 0.9 um to 3 um, magnification between 0.5 and 3 and focal plan distance between 100 mm to 400 mm.

In a particular case, the light source has a wavelength of 532 nm.

In a particular case, the light source has a wavelength of 905 nm.

In yet another aspect, a method for fast-moving particle characterization is provided, the method comprising: directing a light source at the particles, the light source configured to generate a light beam of incoherent or semi-coherent light; directing the light source to generate the light beam when in receipt of a trigger signal, the light beam being illuminated for a time period on a nanosecond scale; and capturing an image of the particles when illuminated by the light beam.

In a particular case, the light beam is an infrared light beam.

In a particular case, the light beam is a near infrared light beam.

In a particular case, the light beam is captured by a camera preconfigured to focus at a specific working distance.

In a particular case, the camera does not require alignment by a user.

In a particular case, the method further comprises obtaining the light beam from a plurality of light sources, the light from each of the light sources being conditioned into a homogeneous flat-top profile of incoherent or semi-coherent light using optical elements.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa;

similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to particle imaging; and more specifically, to a system, method, and lighting module for fast-moving particle characterization.

Various example approaches for non-contact measurement of particle size include: (1) optical particle counters (2) laser diffraction analyzers, and (3) laser or phase doppler anemometry. Most of these approaches have several lenses and collection optics to increase the intensity of the scattered light detected. In order to keep the spray and particulate flow away from the equipment, either the spray or particulate flow generally has to be confined in a chamber with optical windows or the detecting equipment has to be located far away from the spray. Generally, this results in significant increase in the cost of the equipment since both a higher intensity light and a high-power optics are required.

Other approaches provide direct imaging of sprays for the purpose of droplet sizing. However, many of these approaches are generally not water and dust proof, and therefore, cannot be inserted inside a spray. Thus, such approaches have to be located outside or in a chamber in which the spray flows, where the chamber is equipped with optical windows for imaging the spray. In other approaches, the focal length of the camera is made large enough that the system can be located outside of the spray without being directly exposed to the spray. For such approaches, a powerful light source is generally needed to go through the spray and still have enough luminous power to properly illuminate the spray. Such light sources are mainly laser sources and are relatively expensive, making the approach as a whole very expensive.

Advantageously, the present embodiments address at least some of the disadvantages of the prior art by providing, at least, accurate measurement of droplet size distribution using a particle characterization apparatus that is inserted into the spray environment. In some embodiments, direct imaging of particles is performed using a nano-flash to freeze particle motion and a fast camera to capture the particles. In some cases, both the lighting and the camera can be located in a mechanical housing such that it is submersible and can operate in hazardous locations. In some cases, the housing includes an air curtain to keep windows of the housing clean for proper imaging.

In an example, embodiments of the present disclosure can advantageously combine a high-resolution camera with a nanosecond light-emitting-diode (LED) flash-light for tracking high-speed particles. The imaging results can be analyzed to determine characteristics of fast-moving particles including size, shape, velocity, number, and density.

Embodiments of the present disclosure provide a very short duration flash to effectively 'freeze' the motion of fast-moving particles to prevent motion blur. Embodiments of the present disclosure also provide different light wavelengths to ensure light passes through a medium and generally only interacts with the particles or droplets being measured. Embodiments of the present disclosure also provide an approach for ensuring the image captured is in focus at a specific working distance; which advantageously makes it easier for a user since there is no need for alignment and focusing, and also allows the system to be completely submersible. Embodiments of the present disclosure also allow for the determination of particle and droplet size and shape distributions.

Figure 1:
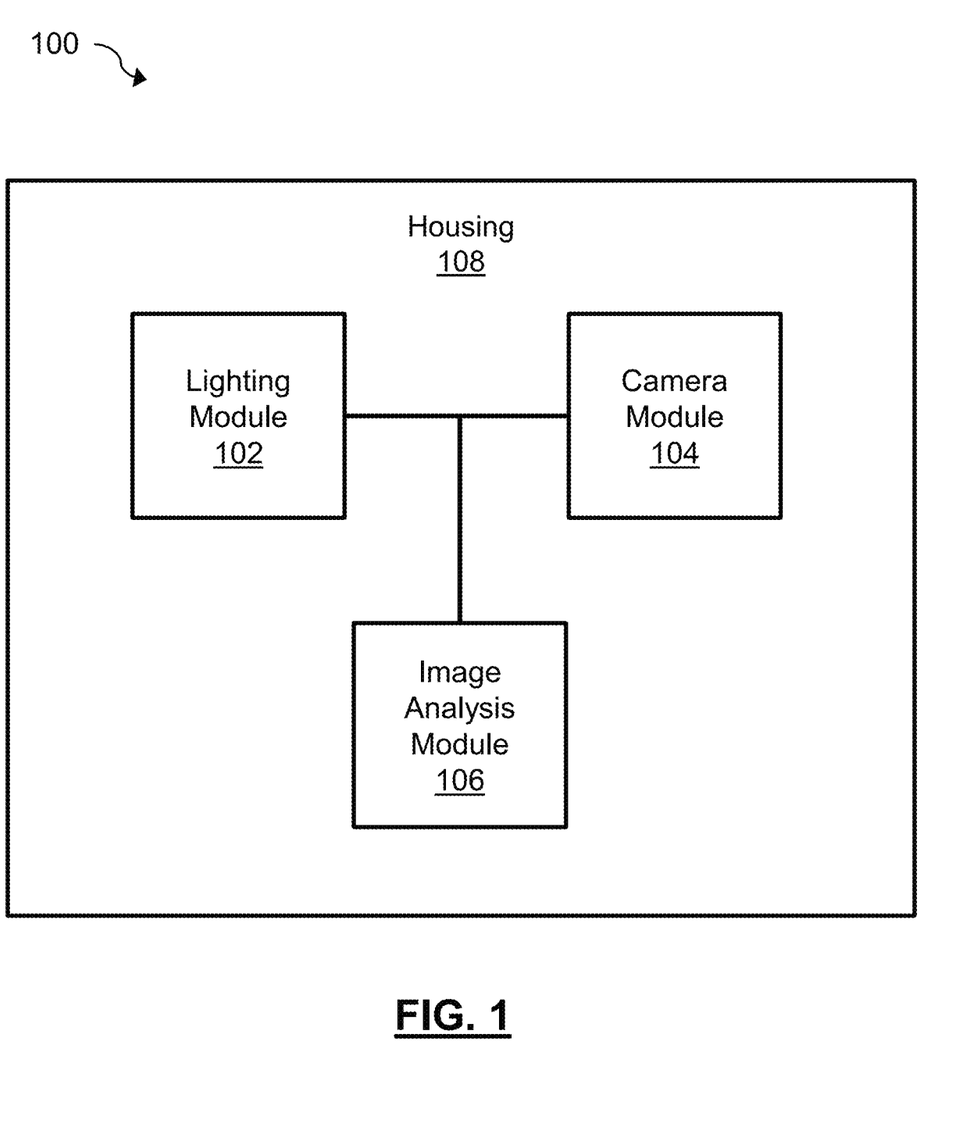
FIG. 1 is schematic diagram of a system for fast-moving particle characterization, according to an embodiment.

FIG. 1 illustrates a schematic diagram of a system for fast-moving particle characterization 100, according to an embodiment. The system 100 includes a lighting module 102, a camera module 104, and an image analysis module 106. The modules can be interconnected or otherwise in communication using any suitable modality. In some cases, the system 100 further includes a housing 108 to house the camera module 104 and the lighting module 104, and in some cases, also the image analysis module 106. In other cases, the image analysis module 106 can be remote from the housing 108.

Figure 2:
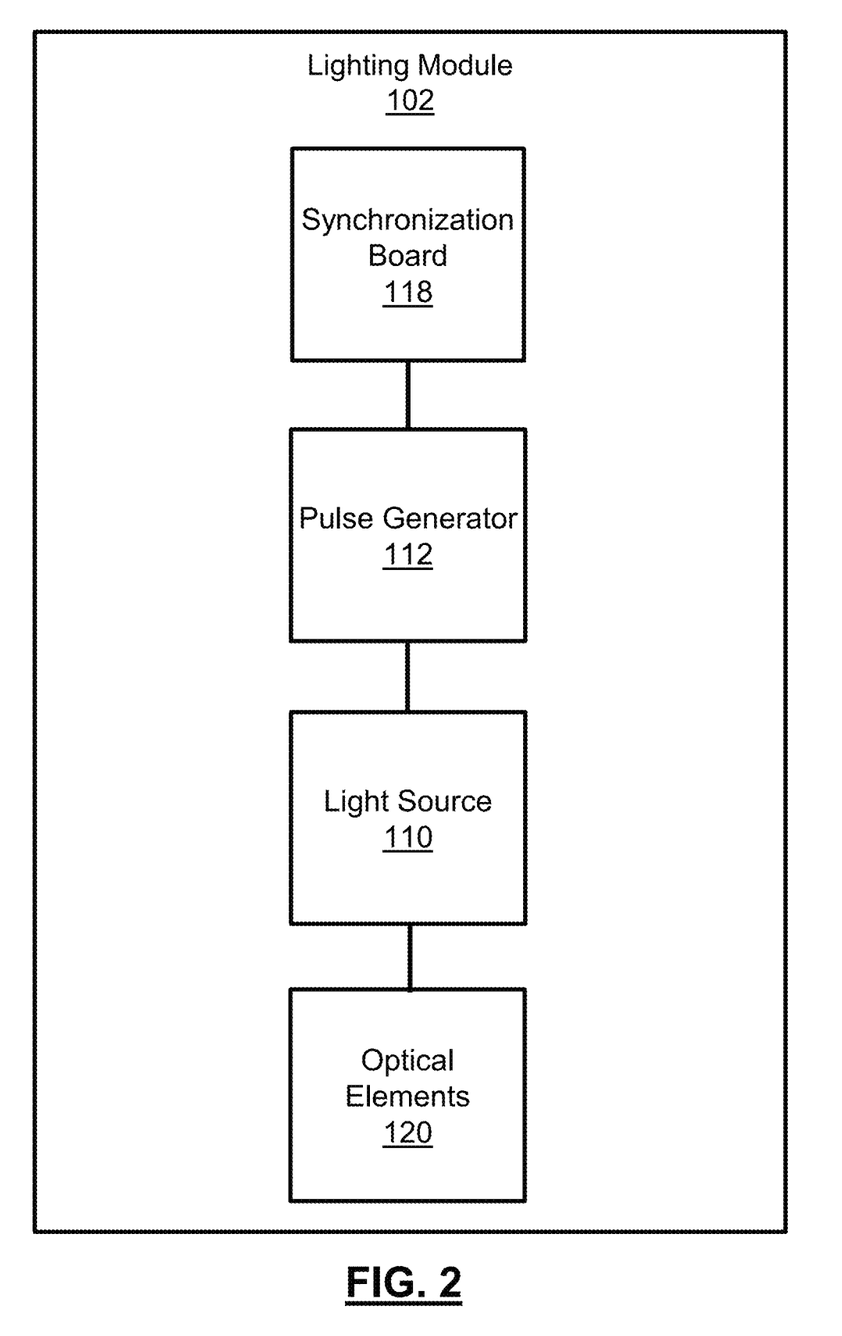
FIG. 2 is schematic diagram of a lighting module, according to an embodiment.

FIG. 2 illustrates an example embodiment of the lighting module 102, which includes a light source 110 (for example, a stacked laser diode array, an light-emitting-diode (LED), a near-infrared (NIR) laser diode, or the like), a pulse generator 112 (otherwise referred to as a current amplifier or function generator), a synchronization board 118, and optical elements 120 to condition the beam. In an embodiment, a laser diode array can be used as the light source 110 because it is bright and compact. In some cases, the light source 110 will include an appropriate driver, such as a laser driver for the laser diode array. In most cases, since a short nanosecond flash is needed to freeze the motion of the particles, light intensity has to be increased high enough to properly illuminate the particles. If the nominal values of the light intensity of a typical laser diode is used, due to its short duration, not enough light energy may be provided to capture the image on a camera sensor. Therefore, the light power must be significantly high for these short duration flashes. To accomplish this, the lighting module 102 includes the pulse generator 112 that can provide current to allow for a high intensity nanosecond flash. In an example, the laser pulse energy can be in the order of 65 uJ and the flash can be on the order of 10 ns-100 ns.

Advantageously, the lighting module 102 can use a high-powered NIR laser diode or LED, as opposed to a lower-power visible wavelength laser. Advantageously, the NIR laser can be more compact than a visible spectrum laser with the same power. There is an inverse relationship between laser power and wavelength. While most other approaches use visible wavelengths, the lighting module 102 can use NIR laser diodes to get a similar brightness on a captured image but with light that better penetrates the spray.

The light produced from the light source 110 can be a combination of beams from each individual diode or LED. For imaging, the beam can be conditioned into a homogeneous flat-top profile of incoherent or semi-coherent light using the optical elements 120. In most cases, the beam should be a flat-top in order to not amplify certain parts of the image, thus making image analysis more accurate. Homogeneous flat top profile generally means that various areas across the laser are the same brightness. Most lasers are naturally brighter in the center of the beam and then get less bright as the distance increases away from the center. For imaging, this property is disadvantageous because even illumination is preferable over every part of the image. If certain portions are illuminated brighter, then it may overexpose that part of the captured image and data can be lost; or if an amplified portion is at the right exposure level, then other portions of the image may be under-exposed and data can be lost. Optical components can be used to create a laser beam that has the same or similar brightness at locations throughout the laser beam; i.e., the profile of the laser is said to be "flat".

The beam generally is formed of incoherent or semi-coherent light because coherent light generally forms significant diffraction patterns around objects in the image plane, making image analysis more difficult. In examples of the optical elements 120, the beam can be shaped by first passing it through a homogenizing light rod which acts to homogenize and decohere the light. The beam can then be passed through a diffuser to decohere the light further. The beam can then be passed through a device to collimate the light, for example, an aspherical doublet lens. In further cases, a microlens array, a liquid light guide, and a fiber optic cable can be used. It is understood that any suitable approach to make the light less coherent can be used.

The light source 110 can be driven by the pulse generator 112, which receives a trigger signal from the synchronization board 118. The pulse generator 112 can generate high voltage and/or high current pulses with specific durations; for example, as low as one nanosecond. The duration of the light pulse and the parameters of the voltage and current can be controlled using the pulse generator 112, which can receive the trigger signal from the synchronization board 118. The trigger signal is generally generated by the camera module 104, which is passed to the synchronization board 118 to compensate for any noise between the camera module 104 output and lighting module 102. The trigger signal can be an electrical pulse output by the camera used to trigger the light source 110 to operate and illuminate the field of view. In most cases, the trigger signal can be produced by the camera automatically immediately before the camera is set to take an image.

The camera of the camera module 104 outputs a synchronization signal that can be noisy. In some cases, due to such noise, if the synchronization signal was sent directly to the pulse generator 112, then it could cause the light source 110 to falsely trigger. In this way, the synchronization board 118 can be used between the camera module 104 and the pulse generator 112. The synchronization board 112 can, in some cases, accurately detect the camera signal over the background noise and output a noise-reduced signal to the pulse generator 112. The synchronization board 118 can use any suitable noise reduction algorithm.

Once the pulse generator 112 receives the trigger signal from the synchronization board 118, the pulse generator 112 then sends a pulse (in most cases, a high voltage, high current pulse) to the light source 110 that gets converted into light. The connection from the pulse generator 112 to the light source 110 generally has very low inductance. In many cases, to have maximum energy transferred to the light source 110, the pulse generator 112 can be situated close to the light source 110.

Generally, for other approaches, magnification for objective lenses changes with the distance of the captured object. This makes it difficult for a user to calibrate for randomly distributed particles and droplets in space. In order to eliminate the need for such focusing and calibration, the camera module 104 can use a Telecentric lens. Telecentric lenses only accept light perpendicular to the lens surface, thus any object in the field of view stays the same size at any distance within the depth of field. The present inventors conducted example tests to determine a proper combination of (i) camera resolution and pixel size, and (ii) a Telecentric lens with suitable magnification, focal length, and depth of field to capture particles as small as 5 µm. The present inventors determined that the system 100 was able to measure particles down to 5 microns used in hazardous location requirements. In the tests, the resolution ranged from 6-18 MPix, the pixel size ranged from 0.9 um-3 um, the magnification ranged from 0.5×-3×, and the focal plane distance (working distance) ranged from 100 mm-400 mm.

In some cases, optical power output can be limited to meet hazardous location (Haz Loc) requirements. In such cases, optical power can be lowered below 85 uJ per pulse to ensure the light source 110 is intrinsically safe. Advantageously, camera and lens combination of the camera module 104 is sensitive to low light/power using a telecentric lens with high transmission and low magnification; as well as a camera with physically small pixels to make up for the low magnification lens. This arrangement of the camera module 104 permits the lighting module 102 to use a small, low powered laser. Advantageously, the system 100 can use various magnification lenses for the same working distance without requiring the measurement location to change. Lenses with lower magnification are generally physically smaller, making such lenses more compact than other approaches.

The housing 108 advantageously can enclose all of the optical and electronic components. In this way, the user will generally not have to worry about finding correct settings as fixed lighting module 102 and camera module 104 positions allow for simplified measurement procedure. The housing 108 also advantageously protects the components from a mist environment of a spray, or from any other ambient conditions. This property is substantial because the system 100 will generally be positioned inline and, in some cases, can be positioned inside a spray or particulate flow. Thus, the system 100 can then be low cost, small in size, and easy to use because the measuring components are very close to the particles they are measuring. In this environment, the housing 108 can effectively protect the components of the system 100 against moisture. The housing 108 also advantageously isolates the components inside the housing 108 from the outside environment. In some cases, the system 100 will be operating in a spray environment such as a hazardous location or industrial location, in which there may be a very high explosion danger due to the chemical makeup of the particles. If a spark or small explosion occurs inside the housing, it is essential that it does not cause further ignition or explosions inside the spray environment.

Advantageously, the lighting module 102 allows for a smaller housing 108 and for minimizing the size of the system 100 overall. The present inventors have tested a device embodying the system 100 for protection against dust and liquid. Under such tests, the housing 108 was determined to be water and dust tight, as well as aerodynamic and compact. In such tests, the system 100 was tested such that it could operate in hazardous locations such as an industrial spray environment.

Figure 3:
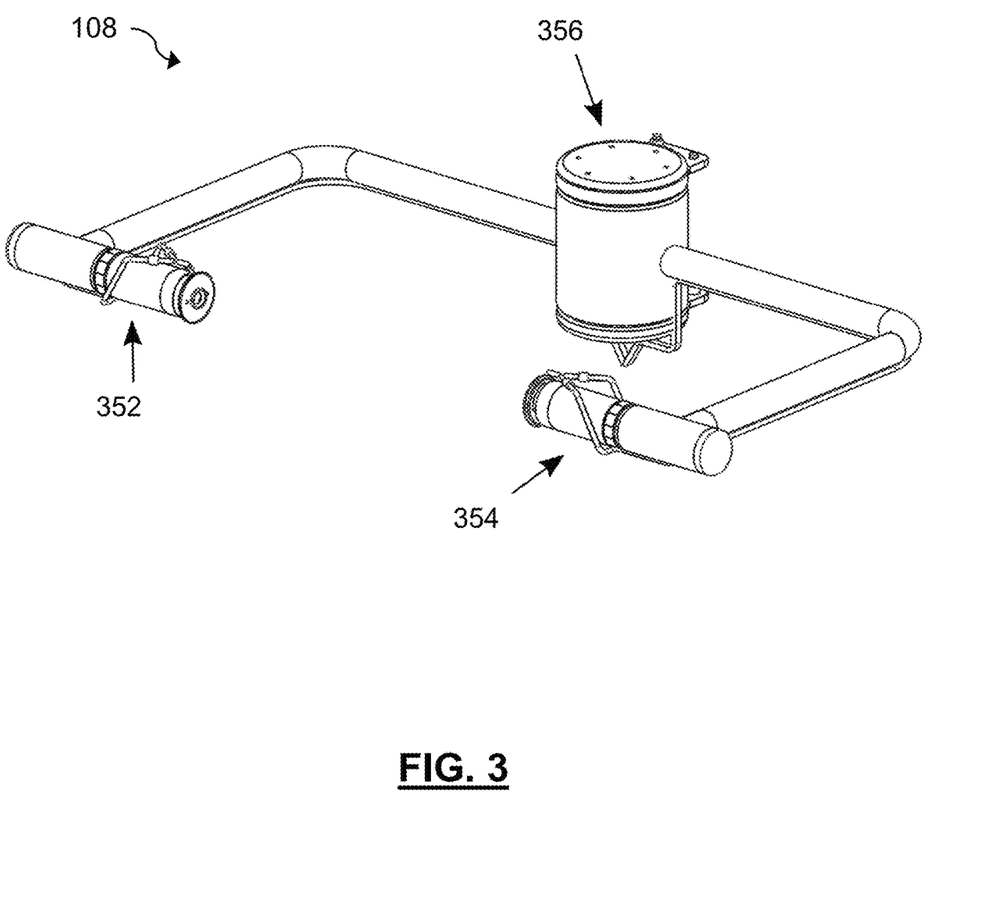
FIG. 3 is perspective view of a housing, according to an embodiment.

FIG. 3 illustrates an example embodiment of the housing 108. In this example, a lighting probe 354 of the housing 108 comprising the lighting module 102 can be a cylinder. In this example, a camera probe 352 of the housing 108 comprising the camera module 104 can also be a cylinder. An imaging section 356 of the housing 108 comprising at least the image analysis module 106 can be connected to the camera probe 352 and the lighting probe 354. The housing 108 can include conduits in house the communication channels for communication between the components of the system 100. It is appreciated that in other examples, any suitable arrangement of the housing and probes can be used. In this example, the housing 108 is made of stainless steel; but in further examples, can be any other suitable material, such as aluminum. Advantageously, in this example, the system 100 can operate in a wide range of temperatures; for example, 0 to 60° C.

Figure 4:
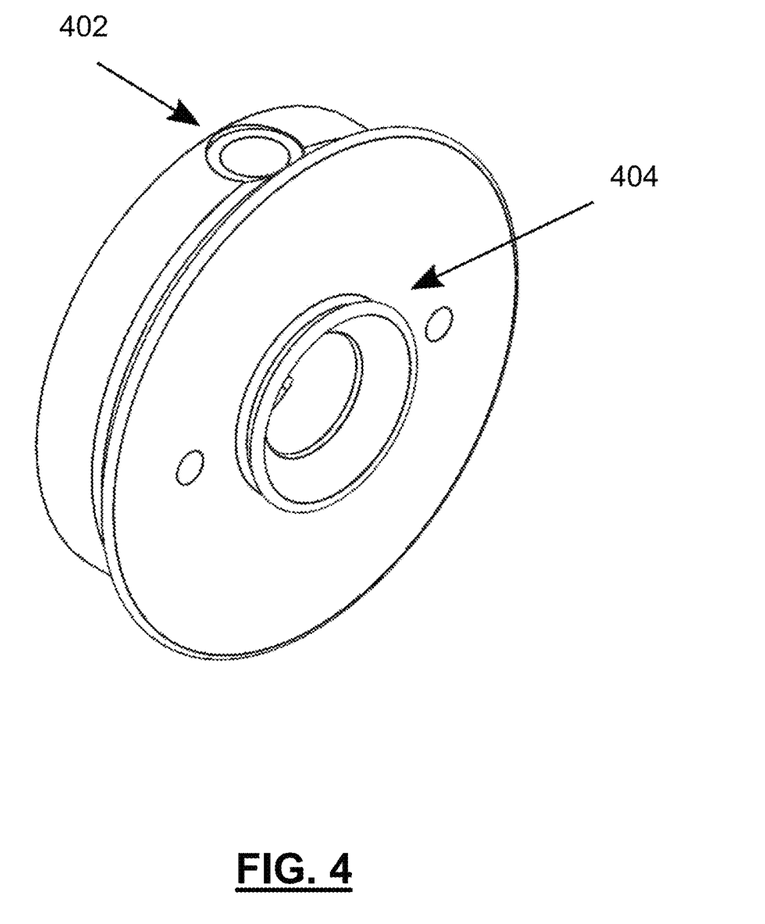
FIG. 4 is perspective view of a front-end piece for the housing of FIG. 3.
Figure 9:
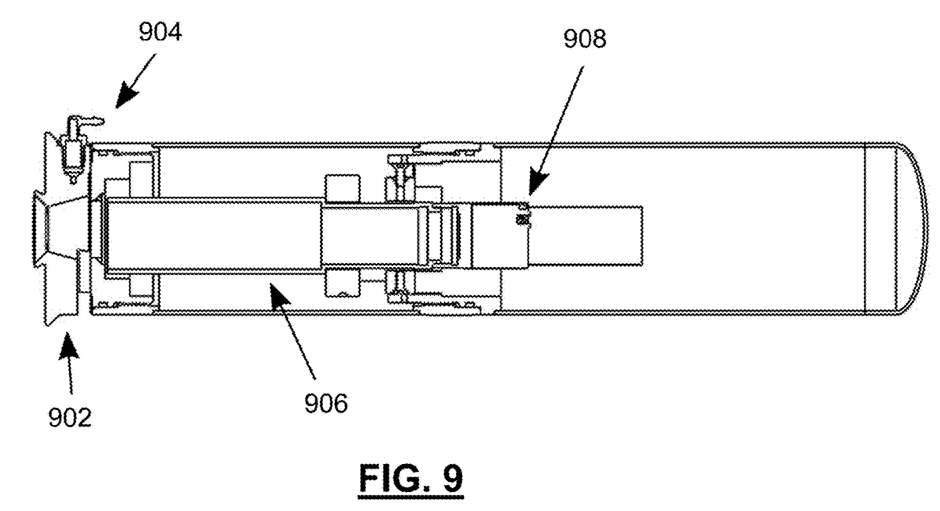
FIG. 9 illustrates a cutaway view of an example of a camera probe
Figure 10:
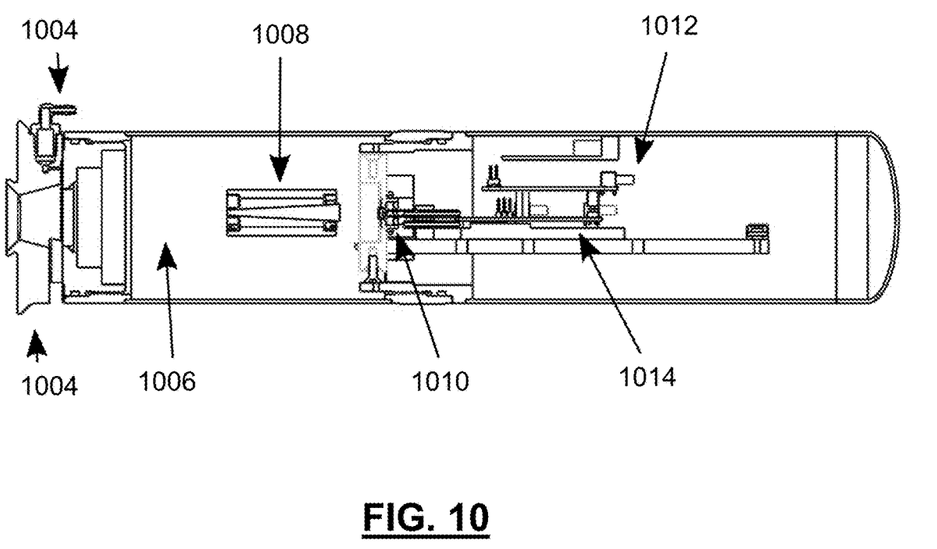
FIG. 10 illustrates a cutaway view of an example of a laser probe.

FIG. 9 illustrates a cutaway view of an example of the camera probe 352 and FIG. 10 illustrates a cutaway view of an example of the laser probe 354. In some cases, as illustrated in FIG. 4, the lighting probe 354 and the camera probe 352 can each have a front window that forms a dust and liquid tight enclosure. In some cases, in front of the camera probe 352 window, a purge plate can be positioned to prevent build up of particles and debris on the windows. Compressed air can enter the purge plate from a purge inlet 402 and form an air curtain to prevent the buildup of dust and liquid on the front window. The front window can also have a lip 404 to prevent the buildup of dust and liquid on the front window.

In this example, the camera probe 352 includes a front cover 902, with a purge inlet 904, a lens assembly 906, and a camera 908. In this example, the laser probe 354 includes a front cover 1002, with a purge inlet 1004, collimating optics 1006, homogenizing optics 1008, a laser 1010, a synchronization board 1012, and a pulse generator 1014.

The probes 302, 304 can be fabricated with any suitable materials; for example, aluminum and quartz disc for the window. The glass for the window can be compressed between an internal retaining ring and the body of the probe. Two O-rings can be used to seal each window. One is placed in a groove and compressed on the body of the probe and the other placed in a groove in the window and compressed around the quartz glass. Threaded holes in the body of the window and clearance holes in the body of the probe can be used; for example, where one of such holes carries compressed air towards the window piece which turns the air flow into an air curtain to keep the droplets away from the surface of the glass and keep the viewing area clean.

In order to keep the windows of the probes 302, 304 clean, the system 100 can, in some cases, have compressed air or any other inert gas clean the windows and have the windows flush to avoid any formation of vortices. In other cases, a solvent, water, alcohol, or the like can be used to clean the windows periodically. Such solvent or other solution may be pumped through the air curtain lines so that a technician is not required to manually clean the windows. In other cases, two lips can be integrated to prevent the liquid build up on various parts of the body entering the window area. In other cases, a slanted surface inside the purge can be used to allow liquid to drain. In other cases, a change in cross-sectional area can be used to balance pressure in front of the window and outside of the purge to prevent particles from being forced onto the window.

Figure 5:
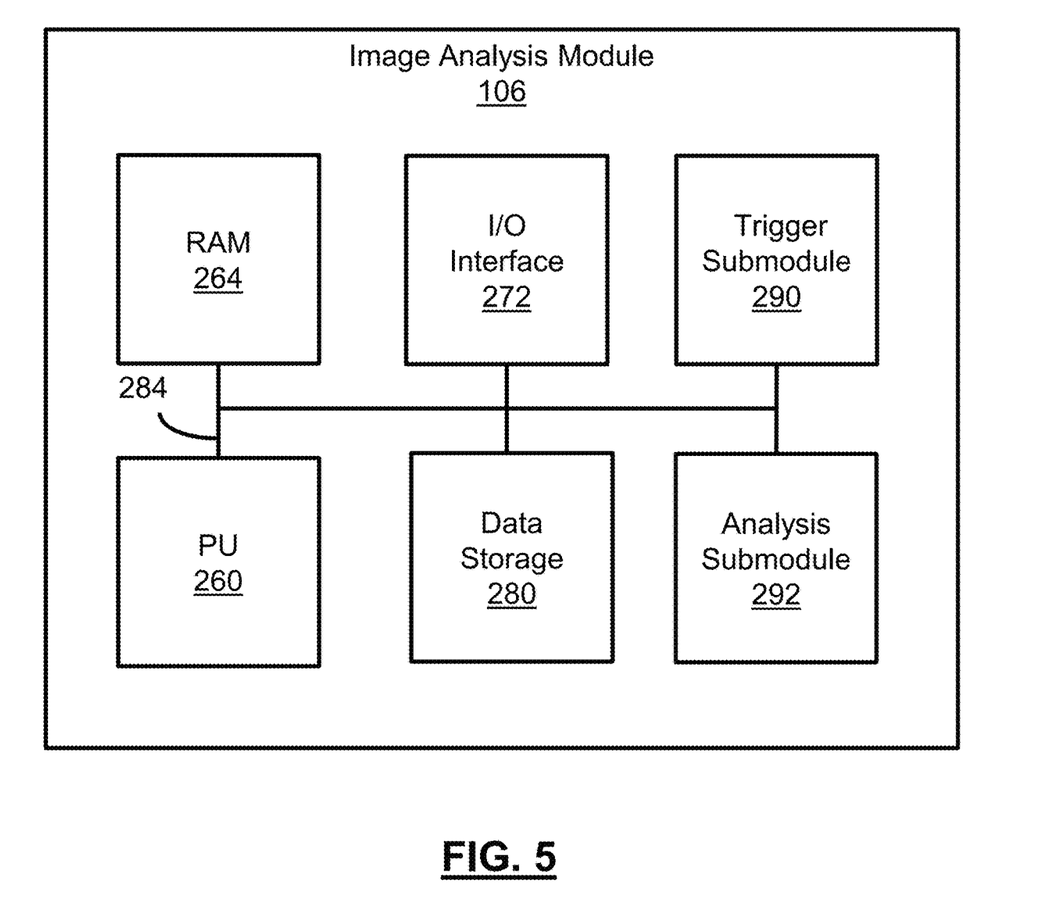
FIG. 5 is schematic diagram of an image analysis module, according to an embodiment.

FIG. 5 illustrates a schematic diagram of an example embodiment of the image analysis module 106. In this example, the image analysis module 106 can include a number of physical and logical components, including a processing unit ("PU") 260, random access memory ("RAM") 264, an input/output (I/O) interface 272, data storage 280, and a local bus 284 enabling PU 260 to communicate with the other components. PU 260 can include one or more processors; such as in a central processing unit or a graphics processing unit. RAM 264 provides relatively responsive volatile storage to the PU 260. The I/O interface 272 enables a user to provide input via, for example, a keyboard and mouse. The I/O interface 272 can also output information to output devices, for example, a display or speakers. The I/O interface 272 can also permit communication with the other modules and/or other systems or computing devices. Data storage 280 stores the operating system and programs, including computer-executable instructions for image analysis, as well as any derivative or related process. During operation of the system 200, the operating system, the programs and the data may be retrieved from the data storage 280 and placed in RAM 264 to facilitate execution.

In an embodiment, the PU 260 can be configured to execute various conceptual submodules, for example, a trigger submodule 290 and an analysis submodule 292.

In further embodiments, the functions of the image analysis module 106 can be executed on dedicated hardware or specific microprocessors, as suitable.

In some cases, the I/O interface 272 can comprise a user interface; for example, through a web browser or cloud computing interface, which allows for easier integration with existing systems. In an example, the user interface can be accessed via direct LAN connection to a server connection to where the system 100 is located, or through the a local Wi-Fi.

The image analysis module 106 can perform a number of operations; for example, with respect to paint sprays:
  performing statistical and visual results to compare various nozzles by:
    bringing a nozzle into the field of view of the camera,
    capturing images of the droplets from the spray,
    determining statistics about the droplet size distribution in real-time,
    collecting more data from as many different nozzles or sprays as needed, and
    storing the data for comparison in post-processing.
  ensuring that there is no damage to the nozzle,
  verifying the spray in between cleaning cycles and/or changing of paint color to ensure that the spray characteristics remain unchanged compared to paint/nozzle manufacturer recommendations or facility specifications,
  preventing improper painting by ensuring consistency of spray prior to the application of paint, and ensuring that the spray characteristics remain unchanged compared to paint/nozzle manufacturer recommendations or facility specifications by measuring droplet size properties and statistics, as described above, to ensure that over time the statistics do not change within a certain tolerance.

Figure 6:
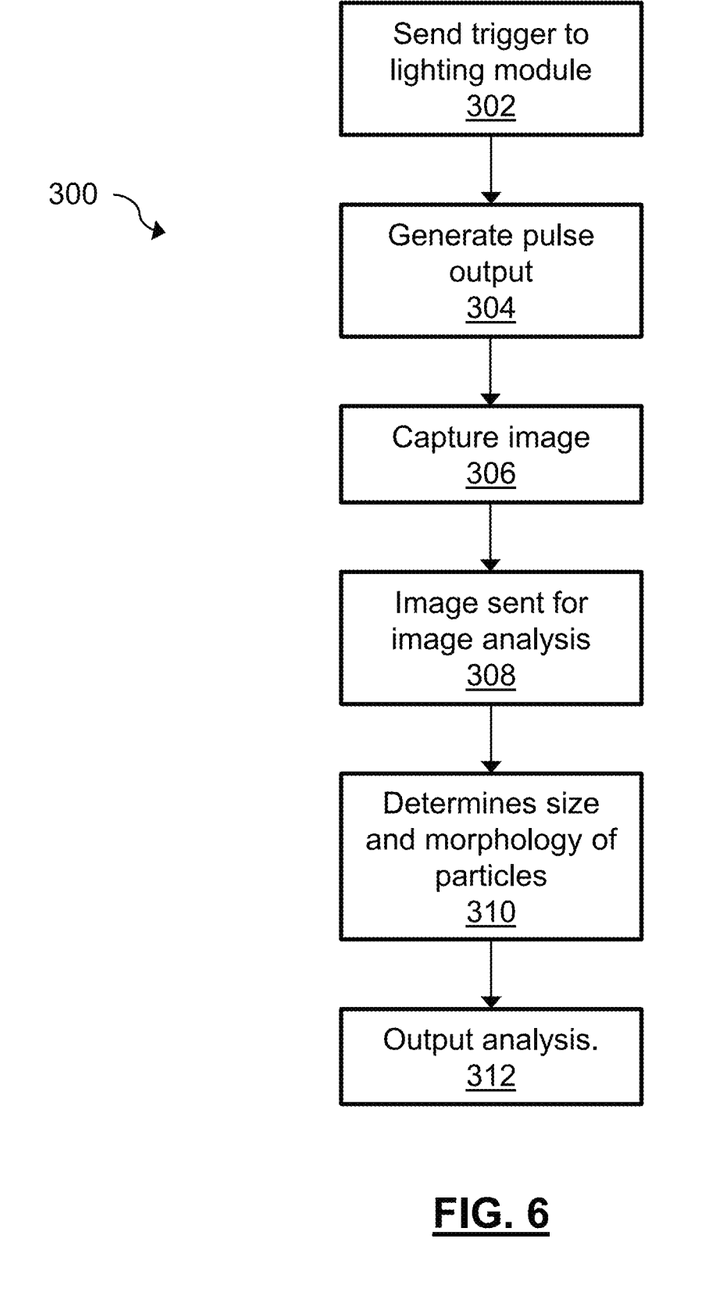
FIG. 6 is a flowchart for a method for fast-moving particle characterization, according to an embodiment.

Referring now to FIG. 6, shown therein is a method for fast-moving particle characterization 300, in accordance with an embodiment. The method 300 may be performed when the system 100 and/or a spray of particles are positioned such that at least some of the spray is located between the lighting probe 354 and the camera probe 352.

At block 302, the trigger submodule 290 or the camera module 104 sends a trigger to the lighting module 102 using, for example, a time-to-live (TTL) trigger output signal.

At block 304, the lighting module 102 generates a pulse output, such as a laser pulse.

At block 306, the camera module 104 captures an image on an image sensor. In some cases, such image can be a shadowgraph image of particles located between the lighting module 102 and the camera module 104.

At block 308, the analysis submodule 292 receives the captured image from the camera module 104.

At block 310, the analysis submodule 292 determines properties of the particles detected in the captured image, such as size and/or morphology, and in some cases, determines statistics based on such properties. Various suitable statistical quantities can be determined from the particle properties, for example, mean, standard deviation, Sauter mean diameter, minimum size, maximum size, number percentiles, volume percentiles, span, and the like.

At block 312, the analysis submodule 292 outputs the analysis. For example, outputting a characterization of the shadowgraph images, size distribution, and statistical quantities to the data storage 280 or to a display or other computing device via the I/O interface 272.

Figure 7:
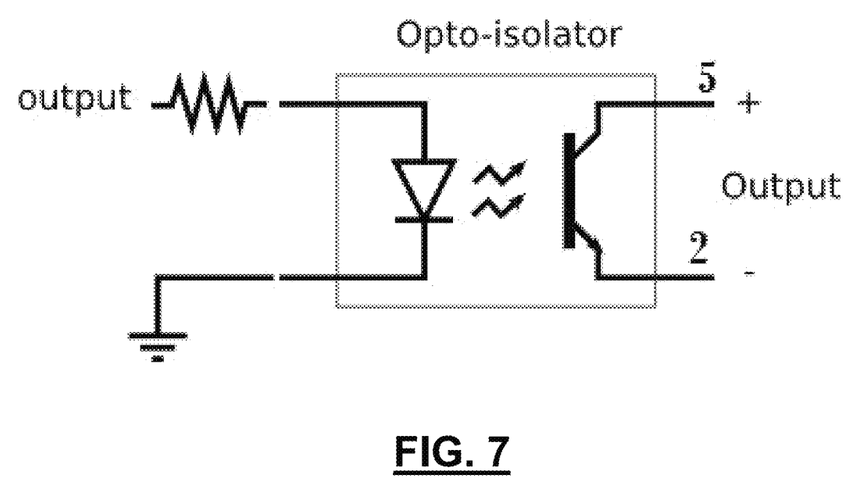
FIG. 7 is schematic of an example opto-isolator.

In an example embodiment, the camera module 104 includes an image sensor, an opto-decoupled trigger, a flash as the light source, and two GPIOs (General Purpose Input/Output). The flash outputs can be galvanically isolated using an opto-isolator, as exemplified in the schematic of FIG. 7, to protect the camera module 104 and the image analysis module 106 against surges. The output of the opto-isolator can be used as an open collector or open emitter output; meaning that the output signal can be connected to ground or to the supply voltage. The camera exposure can be synchronized with the light source 110 such that an image can be recorded by the image sensor. The image formed can be a shadowgraph of the particles in a field of view of the image sensor. The shadowgraph produces shadows that are used to identify the morphology of the particles. The morphology can be any geometric information about the particle; including diameter, perimeter, area, aspect ratio, eccentricity, and the like.

Shadowgraphy is a technique of producing and analyzing shadows of an object, rather than the object itself. In shadowgraphy, the light source 110 is located behind the object being imaged and thus the object blocks the light from going into the camera and produces a shadow (darker region) on the camera sensor. The shadows have exactly the same geometry as the object itself, so the object's morphology can be determined by detecting and analyzing the shadows in the image.

In most cases, the image analysis module 106 can consider various factors; for example, (i) whether drops and particles are in focus or out of focus, and how to identify and correct for such effects; (ii) what is the effect of droplet or particle motion on the image quality and measurement; and (iii) how accurately the particle edges are defined. Additionally, the image analysis module 106 can perform image acquisition, image processing, and user interface and data logging automatically. Images captured by the camera module 104 can either be processed by the image analysis module 106 in real-time, or stored in the data storage 280 and later processed.

The parameters for the flash output of the camera module 104 can be set by a user. In some cases, flash output can have two modes, high active and low active. The digital output is set to "High" during the exposure in high active mode. The digital output is set to "Low" during the exposure in low active mode. Flash delay sets the delay for the digital output. After an exposure has started, activating the digital output is delayed by the time set in flash delay. Duration sets the switching time of the digital output. The digital output is activated for the time set in Duration.

In order to capture high-contrast images of the spray of particles, in an example, the flash (for example, an array of light-emitting-diodes (LED)) can trigger for a few hundred nanoseconds. Because of the short exposure time, very high illumination intensities are generally needed. In an example, the flash can comprise a high-power green LED (PT-120 LED drawing 30 A at 5.9 V to drive a maximum luminous flux of 5200). In an example, an LED driver module can be used that allows applying high current (up to 240 A) and voltage (up to 100V) pulses to the LED. The LED driver generates a pulse width of 60 ns to 1 µs. The pulse width can be dictated by the trigger input signal.

In some cases, it may not be possible to trigger the input signal of the LED driver with the flash output signal from the camera module 104 because, generally, the maximum pulse width that can be generated by the camera module 104 is only 40 µs. In order to achieve short controlling pulses, it is possible to use a programmable version of the pulse generator 112.

Figure 8:
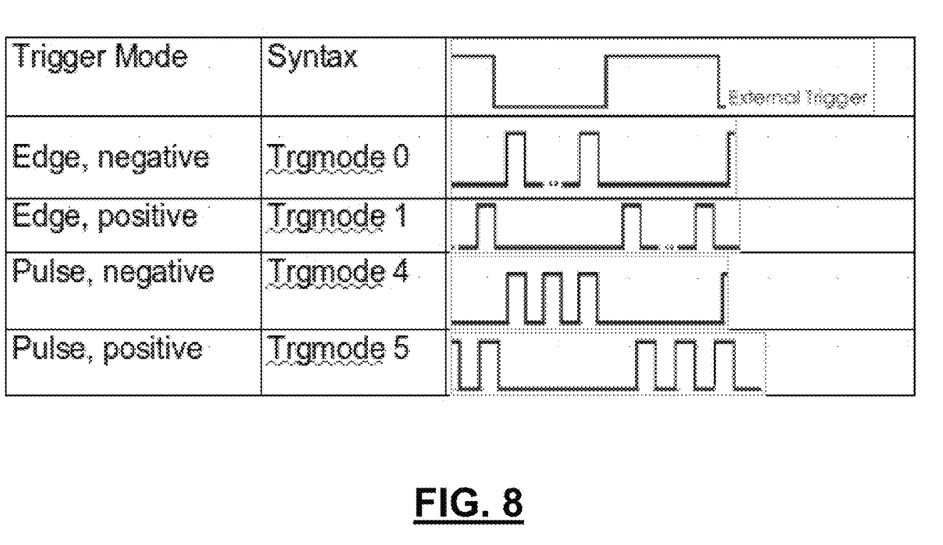
FIG. 8 shows various example triggering modes.

In an example, the pulse generator 112 can have four triggering modes, as illustrated in FIG. 8; however any suitable number or suitable type of triggering can be used. Proper positioning of the flash can be determined by selecting a suitable triggering mode. Triggering modes 1 and 4 (Trgmode 1 and Trgmode 4) can be used if the camera module 104 flash output signal is set on active high. Triggering modes 0 and 5 (Trgmode 0 and Trgmode 5) can be used if the camera module 104 flash output signal is set on active low. The number of generated pulses can be determined by the user via shots syntax.

While the pulse generator 112 is connected to the LED driver, the voltage mode can be active by default and used for calibration to change the mode into the current mode. $U_{min}$ is as a minimum value for the voltage (Slightly more than the threshold voltage for the diode, for example, 12V) and Over-Current is a maximum diode current used for calibration. If the error occurs during the calibration it is shown that $U_{min}$ need to be increased. When LED is changed, the calibration can be performed again since the pulse generator cannot detect the change. When the calibration is completed, the mode can change automatically to the current mode. The laser diode 110 can be switched on after the current, voltage, repetition rate, triggering mode, shots are adjusted in the current mode using a suitable syntax.

Advantageously, the present inventors have determined that the system 100 can measure particle sizes of down to, for example, 5 microns. In an example, the pulse duration of 10-100 nanoseconds can be generated. In an example, light wavelength was either 532 nm or 905 nm, but can be changed depending on each specific application. Depending on the optics, in an example, the depth field can range from 50 μm to 1 mm.

Advantageously, the system 100 can provide a modular design that allows it to be used in multiple settings and industries. The system 100 allows for easy interchange of certain components for different applications, without changing the function or operating principle of the system 100. For example, the camera can be changed for higher or lower resolution or higher or lower pixel size, or the lens can be changed for higher or lower magnification.

Additionally, the system 100 has small size and low weight compared to other solutions; in an example, between 20 kg-35 kg.

Figure 11A:
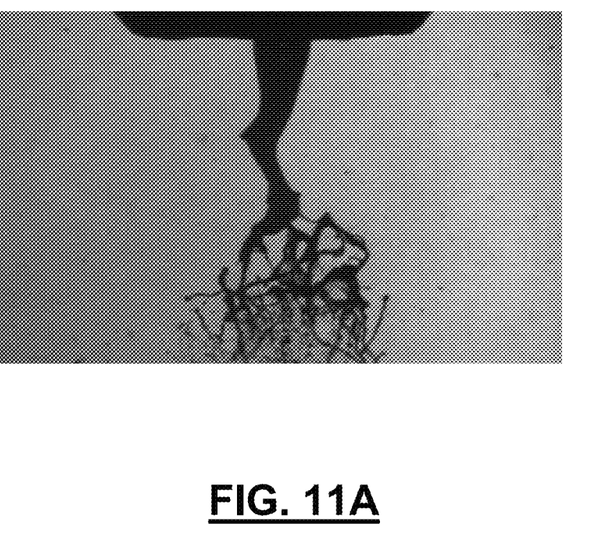
FIG. 11A illustrates an example Biodiesel spray formation image taken using the system of FIG. 1
Figure 11B:
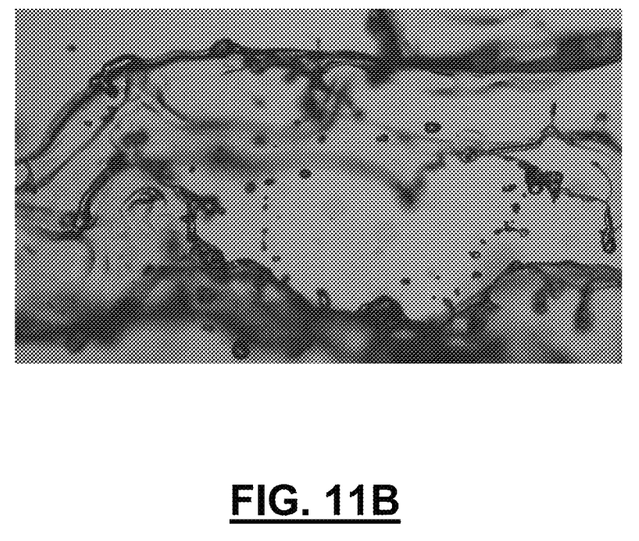
FIG. 11B shows an example water breakup into droplets image taken using the system of FIG. 1.
Figure 12A:
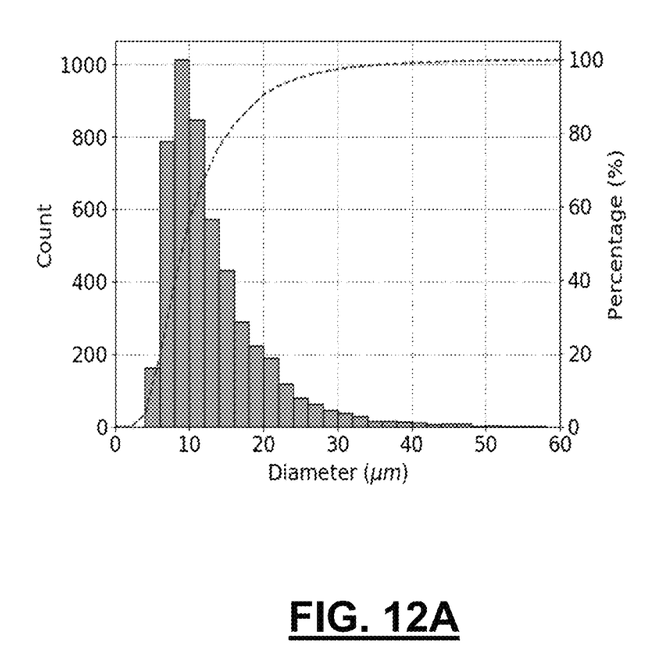
FIG. 12A is a graph showing size distribution from an example experiment using the system of FIG. 1.
Figure 12B:
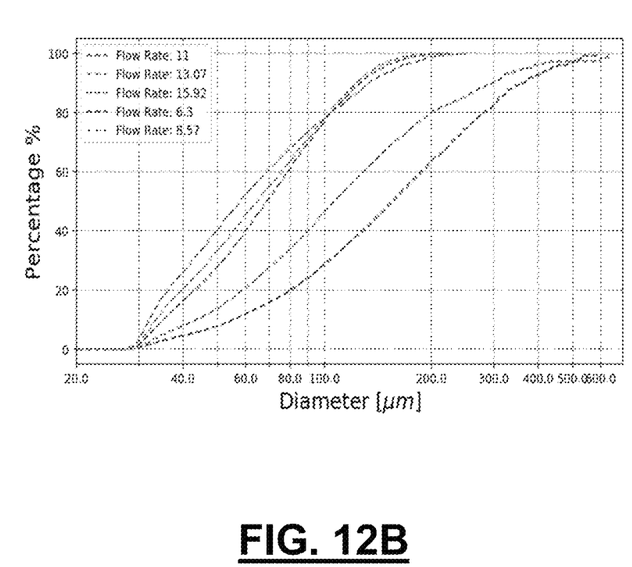
FIG. 12B shows a comparison of cumulative volume distribution between different sprays for the example experiment.

The present inventors conducted example experiments to substantiate the advantages of the system 100. The system 100 was placed under a spray of particles for preliminary tests. A spray booth was used with a pump to circulate water from a tank to a swirl hollow cone nozzle. The average droplet size in this type of nozzle at the tested pressure (60 psi) was 40 microns. The nozzle disintegrated the flow into the droplet by swirling the flow and forming a circular liquid sheet which rapidly break into droplets. FIGS. 11A and 11B illustrate examples of the system 100 capturing droplets and imaging a spray immediately as it exits a nozzle. FIG. 11A illustrates a Biodiesel spray formation, illustrating that the system 100 can image near-nozzle sprays. Generally, other spray measurement devices are not able to image the near nozzle characteristics and can only produce droplet size statistics. FIG. 11B shows water breakup into droplets, taken using the system 100 with 60 ns flash duration at 4 frames-per-second. The images show satisfactory resolution and contrast, which enables a user to study the formation of ligaments and measure the diameters of the droplets as small as 5 microns. FIG. 12A is a graph showing size distribution from the example experiment and FIG. 12B shows a comparison of cumulative volume distribution between different sprays.

The combination of laser, lens, and camera of the present embodiments is particularly advantageous. Most other approaches use high-magnification lenses that require large, high-powered lasers that use visible wavelengths; making such approaches physically large and cumbersome. In contrast, the present embodiments can use infrared lasers with low magnification lenses and a high-resolution camera to make the system significantly compact compared to other approaches.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. An apparatus for fast-moving particle characterization, the apparatus comprising:
   a light source directed at the particles to generate a light beam of incoherent or semi-coherent light;
   optics to condition the light beam into a homogeneous flat-top profile;
   a pulse generator coupled to the light source to direct the light source to generate the light beam when in receipt of a trigger signal, the pulse comprising a time period on a nanosecond scale; and
   a camera for capturing an image of the particles when illuminated by the light beam.

2. The apparatus of claim 1, wherein the apparatus is insertable into a spray environment.

3. The apparatus of claim 1, wherein the apparatus further comprises a mechanical housing enclosing the light source, the pulse generator and the camera.

4. The apparatus of claim 3, wherein the housing is submersible and operable in hazardous locations.

5. The apparatus of claim 1, wherein the light source comprises infrared lasers.

6. The apparatus of claim 1, wherein the camera is a high-resolution camera.

7. The apparatus of claim 1, wherein the camera is preconfigured to focus at a specific working distance.

8. The apparatus of claim 1, further comprising a telecentric lens with high transmission and low magnification.

9. The apparatus of claim 1, further comprising a window disposed between the camera and the particles.

10. The apparatus of claim 9, further comprising a purge plate disposed between the window and the particles to prevent build in of particles and debris on the window.

11. The apparatus of claim 10, further comprising a purge inlet in fluid communication with an outlet proximate the purge plate, wherein a fluid flowing through the purge inlet forms a curtain along the purge plate to further prevent build in of particles and debris on the window.

12. The apparatus of claim 3, wherein the housing comprises an air curtain to clean windows of the housing.

13. The apparatus of claim 1, further comprising an image analysis module to determine characteristic of the particles, comprising one or more of size, shape, velocity, number, and density.

14. The apparatus of claim 1, wherein the light beam comprises at least one of:
   optical power less than 85uJ; or optical power in the order of 65 uJ and the pulse has a duration on the order of 10 ns to 100 ns.

15. A method for fast-moving particle characterization, the method comprising:
   directing a light source at the particles, the light source configured to generate a light beam of incoherent or semi-coherent light;
   conditioning the light beam into a homogeneous flat-top profile;
   directing the light source to generate the light beam when in receipt of a trigger signal, the light beam being illuminated for a time period on a nanosecond scale; and
   capturing an image of the particles when illuminated by the light beam.

16. The method of claim 15, wherein the light beam is an infrared light beam.

17. The method of claim 15, wherein the light beam is a near infrared light beam.

18. The method of claim 15, wherein the light beam is captured by a camera preconfigured to focus at a specific working distance.

19. The method of claim 18, wherein the camera does not require alignment by a user.

20. The apparatus of claim 1, further comprising collimating optics to collimate the light beam.

* * * * *